April 3, 1962 — J. T. McNANEY — 3,027,779
CONTROL APPARATUS
Filed Dec. 23, 1959 — 4 Sheets-Sheet 1
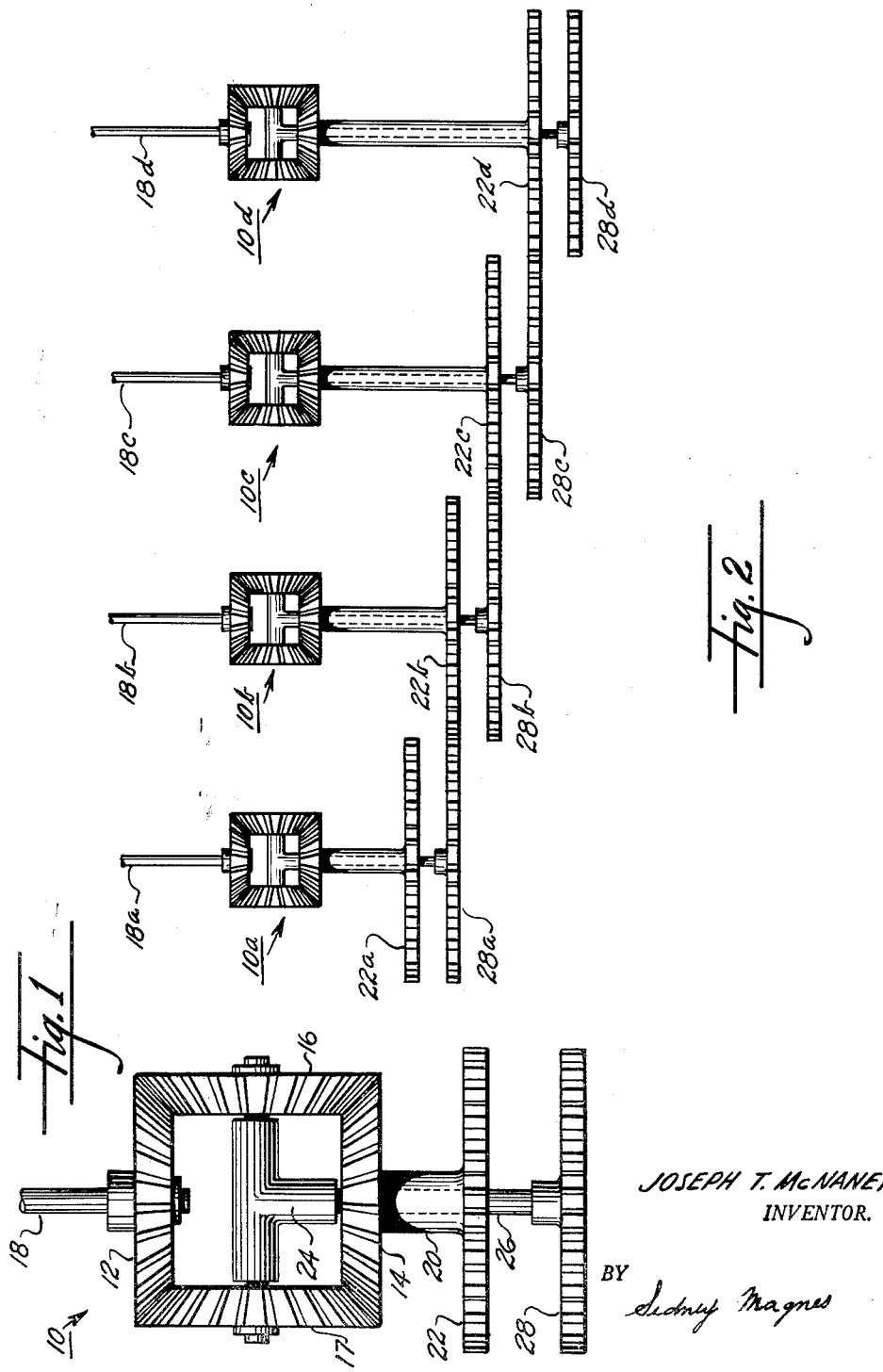
JOSEPH T. McNANEY
INVENTOR.

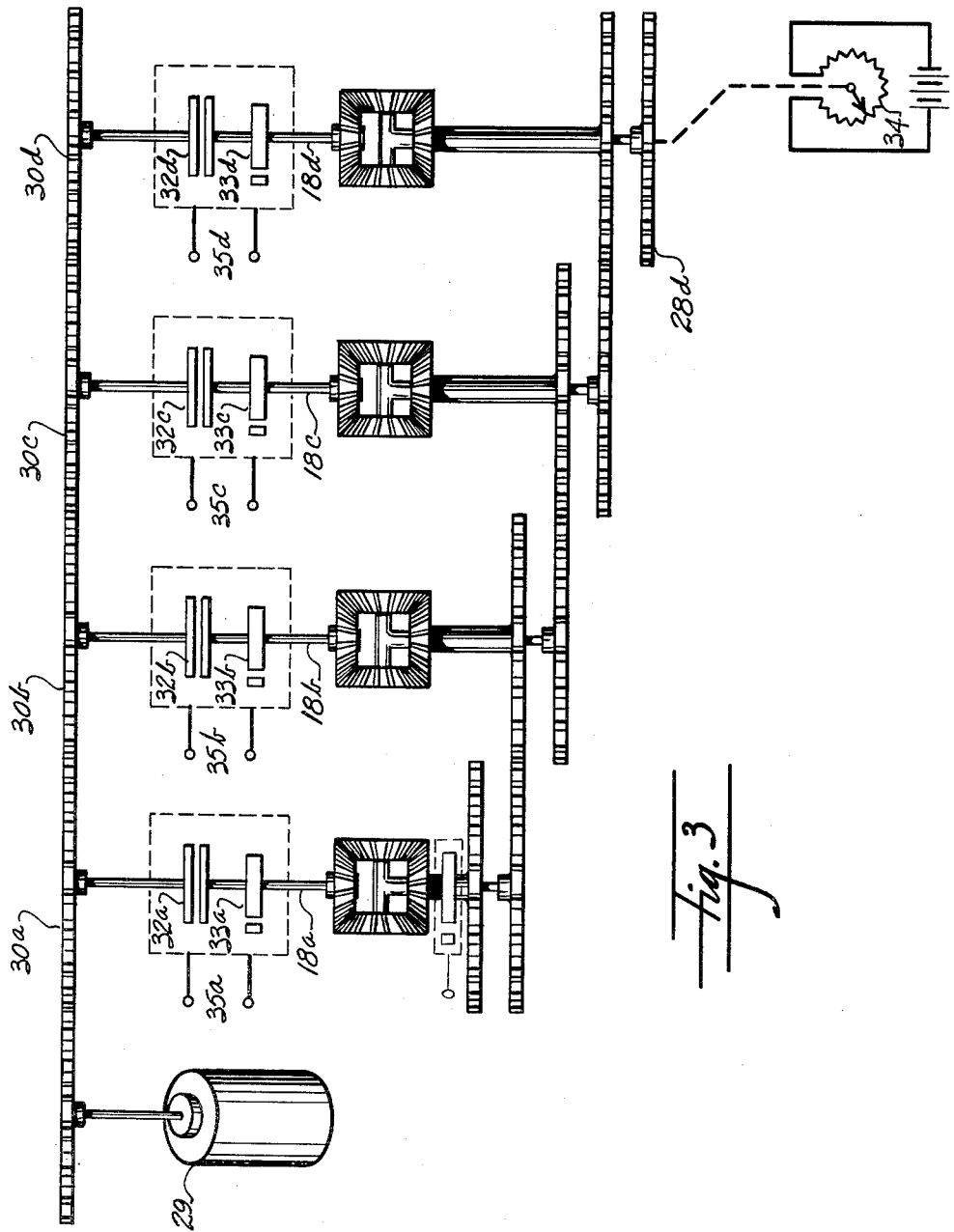

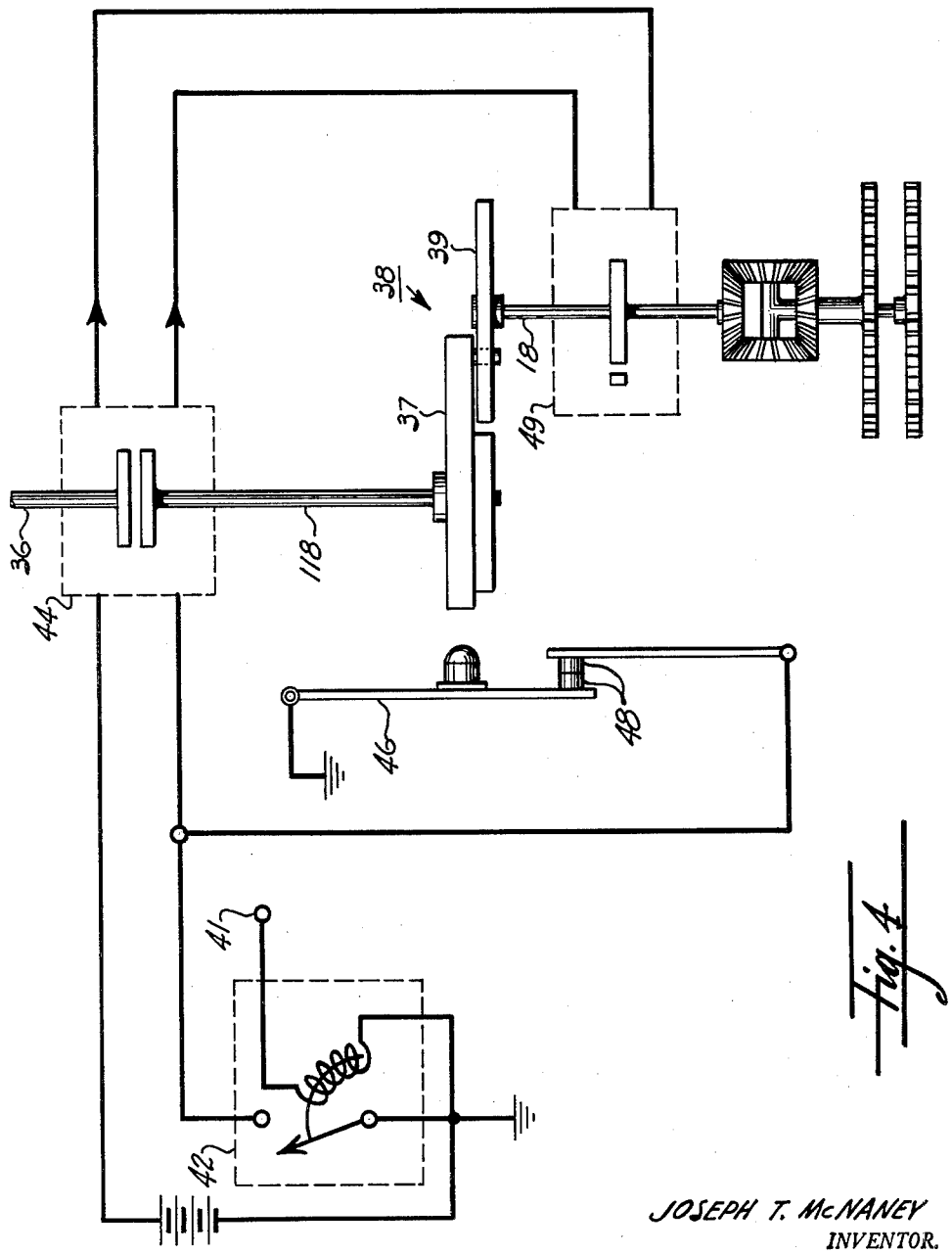

though the designations "first" and
United States Patent Office 3,027,779
Patented Apr. 3, 1962

3,027,779
CONTROL APPARATUS
Joseph T. McNaney, La Mesa, Calif., assignor to General Dynamics Corporation, Rochester, N.Y., a corporation of Delaware
Filed Dec. 23, 1959, Ser. No. 861,520
12 Claims. (Cl. 74—679)

This invention relates to positioning apparatus, and more particularly to apparatus wherein a mechanical or an electrical input selectively rotates a shaft to produce a mechanical or an electrical output.

In many applications a shaft, roller, drum, antenna, search-light, or other device must be rotated either a given amount or to a predetermined position—frequently at a specified speed. Examples of a simple mechanical-to-mechanical usage are the channel selector of a television set, and the paper-positioning roller of a typewriter.

A large number of electrical-to-mechanical devices have the same requirement, except that more elaborate positioning is necessary. One example of such a more demanding device would be an automatic printer that is energized by punched cards or a tape, and prints information on a pre-printed form, such as an invoice. The printer must frequently print unspecified lines—the name, address, date, purchased items, totals, and subtotals. It is apparent that, unlike a typewriter, the printer may have to skip lines—forward, or even backward—and still end up at a precisely determined point, so that the next line to be printed falls into a given space.

An electrical-to-electrical situation is involved in the so-called "digital-to-analog" conversion. In this case, information—say a speed of 100 miles per hour expressed in code form—is to be converted to 100 volts, which represents the same information in analog form. In this case, the electrical input rotates a shaft whose resultant position controls a device that provides the desired output voltage.

The signals for energizing the necessary movement are readily available. For example, mechanical inputs can be obtained from shafts, levers, gears, etc., and electrical inputs can be obtained from punched cards, magnetic tape, computors, etc.

It is therefore the principal object of my invention to provide an improved positioning apparatus.

It is a further object of my invention to provide an improved shaft rotating apparatus whose inputs and outputs may be either mechanical or electrical.

The attainment of these objects and others will be realized from the following specification taken in conjunction with the drawings of which:

FIGURE 1 is a symbolic representation of a differential;

FIGURE 2 illustrates the basic concept of my invention;

FIGURE 3 shows one embodiment of my invention;

FIGURE 4 shows a shaft position control arrangement using a Geneva gear; and

Figure 5:
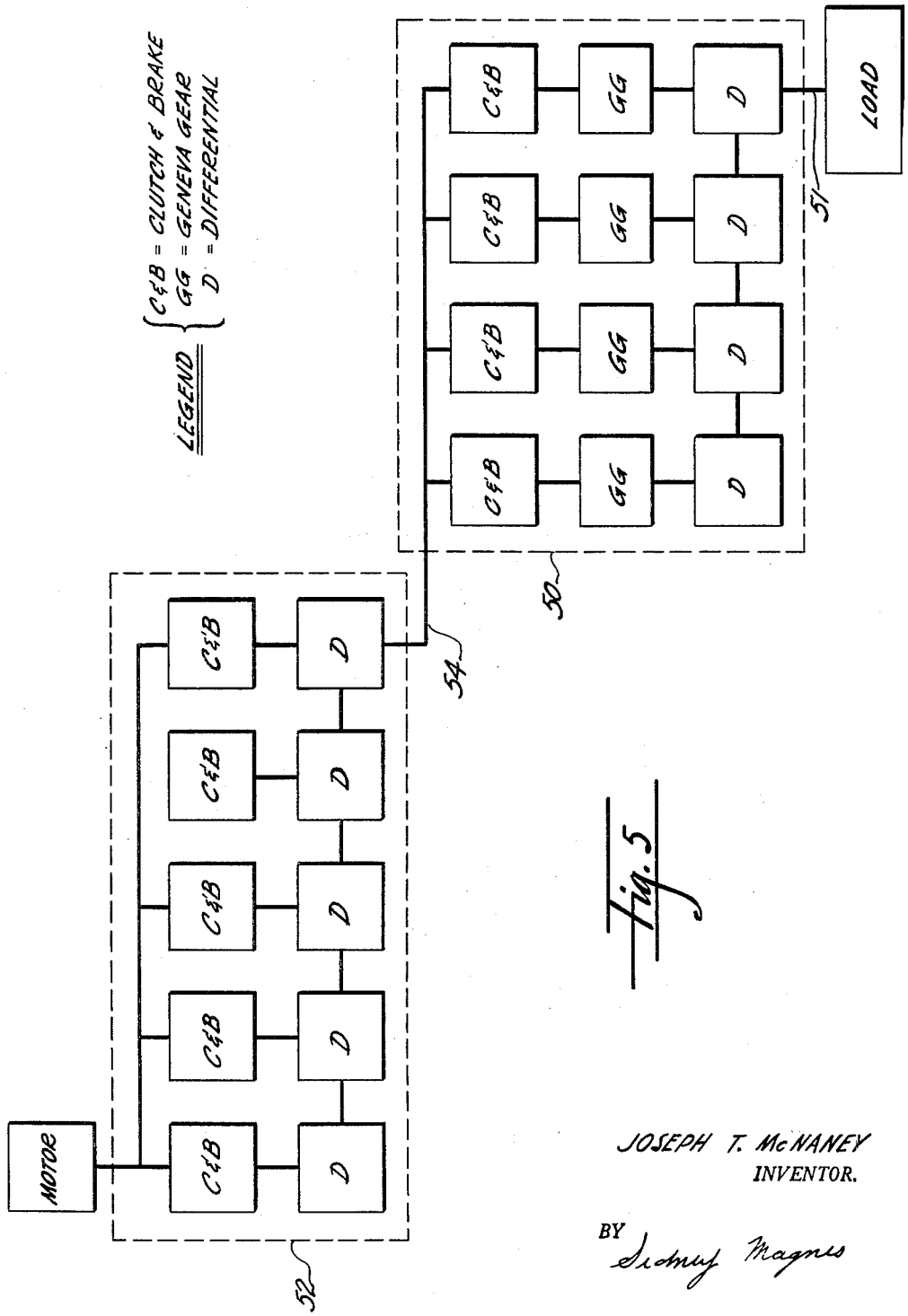
FIGURE 5 depicts an imprived speed and shaft positioning embodiment.

Broadly speaking, my invention contemplates a gear train comprising a plurality of cascaded mechanical linkages of the type known as "differentials." Input information applied to an input shaft of one appears at the output thereof in a predictable manner, and the output of said differential acts as the input for a subsequent differential or train of differentials.

Differentials, their structure, and the theory of their operation, are explained by Franklin D. Jones in "Ingenious Mechanisms for Designers and Inventors," vol. I, page 365, et seq. This explanation points out that a differential may have three shafts, whose relative motions depend upon various conditions.

To aid in understanding my invention, a brief summary of the differential's operation will be presented with the aid of FIGURE 1. The symbolically shown differential 10 comprises two bevel gears 12 and 14, and a pinion gear 16. An additional pinion gear 17 adds mechanical strength, but is actually unnecessary in the operation of the differential. Bevel gear 12 is rigidly affixed to shaft 18, and gear 12 and/or shaft 18 will be called the first "input." Bevel gear 14 is rigidly affixed to shaft 20, which in turn has a spur gear 22 rigidly affixed thereto. Gear 14, and/or shaft 20, and/or gear 22 will be called the second "input"; al"second" may be readily interchanged. Pinion gear 16 pivots on one arm of a cross member 24, which in turn is attached to a shaft 26 that extends through the second input assembly and terminates in gear 28. Shaft 26 and/or gear 28 will be called the "output."

As explained in the above-mentioned book, if second input 22 is locked so that it cannot rotate, and first input 18 is rotated—output 28 will rotate half as fast as input 18—or stated in another way, output 28 will rotate half as far as input 18 in the same length of time. If on the other hand input 18 is locked while input 22 is rotated, output 28 will also rotate half as far as the input. Thus, the output of the differential under either of the above conditions is half of the input.

My use of this concept will be understood from a study of FIGURE 2, which is a symbolic representation of a gear train comprising a plurality of differentials. Here differentials 10a, 10b, 10c, etc., are cascaded so that 18a, 18b, 18c, etc., act as the first inputs of respective differentials. Similarly, 22a, 22b, 22c, etc., act as second inputs. Elements 28a 28b, 28c, etc., are then the outputs. Any desired number of differentials may be cascaded in this way.

The cascaded differentials coact in the following manner. Turning our attention to differential 10a, assume that input 22a is locked, and that input 18a is rotated 360 degrees. As previously explained, output 28a will rotate half as fast, or—in the same length of time will rotate only 180 degrees. FIGURE 2 shows that output 28a, energizes input 22b which—if properly coupled by gear teeth, belts etc.—will also rotate half as fast or half as far as input 18a. Again, as previously explained, if input 18b is locked, output 28b rotates half as fast as input 22b—or half as far, namely one half of 180 degrees, or 90 degrees. Thus, two differentials, cascaded according to my invention, provide a 4:1 reduction or step-down ratio; i.e., whereas input 18a rotated 360 degrees, output 28b rotates 90 degrees, or one quarter as far. This holds true regardless of which input is used in the energizing differential.

A similar analysis—using three differentials 10a, 10b, and 10c—will show that the relation between input 18a and output 28c will provide an 8:1 stepdown ratio. In this manner, each additional cascaded differential will halve the output of the gear train.

In actual usage, the output shaft of the last differential—28d in this case—would be connected to the load, and the desired step-down ratio would be obtained by using a selected input 18. If input 18b or 18c were used, the unused respective second input would be locked by the coupling to the previous differential. It would be desirable, however, to lock second input 22a.

It will be apparent that if a particular form of differential provides a ratio other than 2:1, or if the coupling is other than 1:1, the input-output relationship of the cascaded differentials will be changed accordingly.

As is well known, a differential—instead of comprising the previously-described gear arrangement—may consist of spur gears, friction wheels, or some other mechanical train. All, however, are substantially identical in operation.

FIGURE 3 shows another embodiment wherein a driving motor 29 serves as the basic input. It drives a series of symbolically shown engaged gears 30a, 30b, 30c, etc., each of which is therefore capable of applying an input to its respective differential.

To select a desired one of the available step-down ratios, clutches 32a, 32b, 32c, etc., are inserted, and their state of engagement or disengagement determines which differential is energized,. To provide locking when the clutches are disengaged, brakes 33 act upon the input shafts. Thus a "set," comprising a clutch and a brake, is associated with each differential.

My invention as thus far described causes output shaft 28d to rotate a predetermined amount in a selected direction at a given speed. The amount, direction, and speed may be readily changed beyond the previously disclosed limits by replacing gears 30 with a series of worms and gears. In this way the inputs to the various differentials may have different rates of rotation and/or different directions.

When both inputs of a differential are activated, the output shaft has a different—but known—result, which is also discussed in the previously mentioned book. Briefly stated, the relation is as follows. When both inputs rotate in the same direction, the output rotates in the same direction at one half the sum of the speeds of the inputs. When, however, the inputs rotate in opposite directions, the output rotates in the direction of the faster input—at a rate equal to half the difference of the inputs. It may thus be seen that my arrangement of cascaded differentials, with inputs that are variable both as to speed and direction, is capable of providing a wide variety of input-output relations. While I have described a "reduction" from output to input, the process may be reversed to a limited extent—so that the output rotates to a greater extent than does the input.

The foregoing explanation of my invention has disclosed the basic concept in terms of a mechanical-input-to-mechanical-output relation. To achieve an electrical output, it is only necessary to couple output 28d to a circuit whose electrical output depends on the position of shaft 28d. One exceedingly simple arrangement is to couple mechanically output 28d to the rotatable element of a suitably energized potentiometer 34.

My invention also can use electrical input signals. Referring once more to FIGURE 3, when clutches 32 are of the electrically operated type, their state of engagement is readily controlled by energizing electrical signals applied to terminals 35a, 35b, 35c, etc.

Since inputs 18 are preferably locked when not in use, braking mechanisms 33 are electrically interconnected with their associated clutches, so that when the clutches are disengaged, the locking mechanisms are activated. Both mechanisms are readily controlled by the same electrical signal. In this way, a mechanical input is always available for each differential, and an electrical signal selects the desired step-down ratio by energizing a selected series of cascaded differentials—in this way controlling the rotation of output shaft 28d. A plurality of sequential electrical signals can therefore sequentially rotate output shaft 28d any desired amount in any selected direction at any predetermined speed. On the other hand, simultaneous electrical signals—as may be available from a code generator—will simultaneously energize the input shafts of selected differentials, which will then rotate in their own particular ways. Thus, these inputs, acting simultaneously through the cascaded differentials, rotate output shaft 28d according to a selected plan. It is therefore apparent that my invention can be used as a speed control device, or as a positioning device.

One problem in shaft positioning is that of obtaining exactly the desired amount of rotation, and it may be seen from FIGURE 3 that this depends to a great extent upon the duraton and magnitude of the electrical signals. Another prior-art problem is that of stopping the output shaft after a precise amount of rotation, in spite of its inertia.

The embodiment of FIGURE 4 overcomes both these problems by use of a "holding" circuit and a Geneva gear. A Geneva gear, whose operation is discussed on pages 74–77 of the previously mentioned book, converts continuous rotary motion into intermittent rotary motion, each step of the intermittent rotation having a precisely predetermined angular value.

I apply this principle to each differential, one of which is symbolically shown in FIGURE 4. This shows a continuously rotating shaft 36 connected to the driving member of a clutch, whose driven member is coupled to the driving element 37 of a Geneva gear 38 having a driven element 39. The driven element is connected to an input 18 of a differential.

An electrical holding circuit coacts as follows. An electrical signal applied to terminal 41 closes relay 42, which energizes holding circuit 44, the circuit engaging the clutch and disabling the shaft locking mechanism as previously described. Due to the action of the relay and the holding circuit, the electrical signal can now be of momentary duration. The engaged clutch now rotates driving element 37 of the Geneva gear, and causes its driven element 39 to rotate input shaft 18 a predetermined amount. After this predetermined rotation, shaft 18 is stopped by the inherent action of the Geneva gear. The driving element of the Geneva gear is still rotating, however, under the influence of the engaged clutch. To stop this rotation, element 37 of the Geneva gear—or some other suitable arrangement—de-energizes holding circuit 44, say by moving arm 46 and separating contacts 48. The action disengages clutch 44. If desired, a brake 49 can operate in conjunction with the clutch in the manner previously described. In this way a momentary electrical signal applied to a selected differential will cause its output shaft—and therefore the system's output shaft—to rotate a precisely predetermined amount in a predetermined direction. Momentary signals of the above type are characteristic of coded signals, which may therefore be used as inputs.

My invention as thus far described is capable of rotating the output shaft a given amount—say either 22½ degrees or 180 degrees, in a given interval of time—say, one second. Due to mechanical and inertia considerations, 180 degrees of rotation in one second may be impracticable. Under other conditions, one second may be too long for 22½ degrees of rotation.

FIGURE 5 shows another embodiment, wherein both the speed control and positioning abilities of my invention are used. Cascaded differentials 50 control the amount of rotation imparted to output shaft 51 in the previously described manner, while cascaded differentials 52 control the speed of the input shaft 54—and thus, the length of time required to position output shaft 51. Suppose, for simplicity, that a 32 r.p.s. motor were used, and one rotation (360 degrees) of input shaft 54 is to rotate output shaft 51 one sixteenth of a rotation (22½ degrees). Cascaseded differential array 50 accomplishes the desired step-down by applying the 360 degree rotation to the first differential as an input, to produce a 16:1 (360:22½) stepdown ratio. The use of Geneva gears, brakes, and clutches is of course optional.

If this 22½ degree rotation is to occur in one second, cascaded differential array 52 uses the first differential as an input, for a 32:1 speed reduction, so that shaft 54 rotates once in a second.

If, on the other hand, output shaft 51 were to rotate 180 degrees in two seconds, cascaded differential array 52 would use the second differential as the input, for a 32:2 speed reduction—and cascaded differential array 50 would use the fourth differential as the input for a 2:1 positioning step-down ratio. It may therefore be seen tht cascaded differential arrays 50, 52 may be energized to provide the desired rotation in the predetermined span of time. It is apparent that suitably coded signals can be applied to energize either or both sets of cascaded differentials so that they act in the desired manner.

The particular embodiment of the invention illustrated and described herein is illustrative only, and the invention includes such other modifications and equivalents as may readily appear to those skilled in the art, within the scope of the appended claims.

I claim:

1. A gear train comprising: a source of rotational motion; a plurality of electrically actuated clutches having driving members and driven members; means coupling said driving members of said clutches to said source; a like plurality of Geneva gears having driving elements and driven elements; means coupling said driven members of said clutches to respective said driving elements of said Geneva gears; a like plurality of differentials having first input shafts, second input shafts, and output shafts; means cascading said differentials so that each said second input shaft, except that of the first differential, is coupled to the output shaft of a preceding differential; means locking the second input of the first differential; means coupling said driven elements of said Geneva gears to respective said first input shafts; a like plurality of electrically actuated braking arrangements attached to respective said input shafts—whereby a "set" comprising a clutch and a braking arrangement is associated with each said differential, said set operating so that when the braking arrangement is de-energized, the associated clutch is engaged; a holding circuit for each said set, whereby the holding circuit in one of its states engages its associated clutch and releases its associated brake, and when the holding circuit is in its other state it disengages said clutch and applies said brake; and means whereby a momentary electrical signal can actuate a holding circuit.

2. The combination of claim 1 including means, energized by said Geneva gear, for de-activating said holding circuit.

3. A gear train comprising: a plurality of differentials each having a first input shaft, a second input shaft, and an output shaft; means coupling said second input shafts of each differential, except the first, to the output shaft of its preceding differential to be energized thereby; means for locking the second input shaft of said first differential; means rotating selected said first input shafts—whereby the output of the gear train appears at the output shaft of the last differential; a second plurality of differentials each having a first input shaft, a second input shaft, and an output shaft; means coupling said second input shafts of each differential of said second plurality to the output shaft of its preceding differential to be energized thereby; and means rotating selected said first input shafts of said second plurality, said means comprising a coupling to the output shaft of the last differential of said first plurality, said means comprising Geneva gears.

4. A gear train comprising: a plurality of differentials each having a first input shaft, a second input shaft, and an output shaft; means coupling said second input shafts of each differential, except the first, to the output shaft of its preceding differential to be energized thereby; means locking the second input shaft of the first differential; means rotating selected said first input shafts, said means comprising electrically operated clutches; means comprising electrically operated brakes, for locking the unselected first input shafts; means simultaneously engaging the clutch and releasing the brake associated with a given differential—whereby inputs are applied to selected differentials, and the output appears at the shaft of the last differential; a second plurality of differentials each having a first input shaft, a second input shaft, and an output shaft; means coupling said second input shafts of each differential of said second plurality to the output shaft of its preceding differential to be energized thereby; means locking the second input shaft of said first differential of said second plurality; means rotating selected said first shafts of said second plurality, said means comprising couplings between the output shaft of the last differential of said first plurality and said first input shafts of said second plurality, said rotating means comprising clutches and Geneva gears and electrically operated clutches; means, comprising electrically operated brakes, for locking the unselected first shafts of the differentials of said second plurality; a holding circuit connected to the clutch and brake associated with each differential—whereby when said holding circuit is energized, it engages said clutch and releases said brake, and when said holding circuit is de-energized it disengages said clutch and applies said brake; means causing a momentary electrical signal to energize said holding circuit; and means, energized by said Geneva gear, de-energizing said holding circuit.

5. A gear train comprising: a plurality of "n" differentials, each having a first input shaft, a second input shaft, and an output shaft; means for coupling said second input shafts of each said differential, except the first, to the output shaft of its preceding differential to be thereby energized; means for locking the second input shaft of said first differential; and means for rotating selected said first input shafts only predetermined angular amounts, said means comprising a Geneva gear—whereby the output shaft of the "n" the differential is rotated an angular amount determined by which said first input shafts are selected to be rotated.

6. Apparatus for rotating a shaft a predetermined angular amount, comprising: a plurality of "n" differentials, each having a first input shaft, a second input shaft, and an output shaft; means for coupling said second input shafts of each said differential, except the first, to the output shaft of its preceding differential to be thereby energized; means for locking the second input shaft of said first differential; and means for rotating selected said first input shafts only predetermined angular amounts, said means comprising a Geneva gear and a clutch—whereby the output shaft of the "n"th differential is rotated an angular amount determined by which said first input shafts are selected to be rotated.

7. Apparatus for rotating a shaft a predetermined angular amount, comprising: a plurality of "n" differentials, each having a first input shaft, a second input shaft, and an output shaft; means for coupling said second input shafts of each said differential, except the first, to the output shaft of its preceding differential to be thereby energized; means for locking the second input shaft of said first differential; and means for rotating selected said first input shafts only predetermined angular amounts, said means comprising a Geneva gear, a brake, and a clutch—whereby the output shaft of the "n"th differential is rotated an angular amount determined by which input shafts are selected to be rotated.

8. Apparatus for rotating a shaft a predetermined angular amount, comprising: a plurality of "n" differentials, each having a first input shaft, a second input shaft, and an output shaft; means for coupling said second input shafts of each said differential, except the first, to the output shaft of its preceding differential to be thereby energized; means for locking the second input shaft of said first differential; means for rotating selected said first input shafts only predetermined angular amounts, said means comprising a Geneva gear, an electrically actuated clutch, and an electrically actuated brake; and means for causing an electrical signal to actuate said clutch and said brake—whereby the output shaft of the "n"th differential is rotated only an angular amount determined by which input shafts are selected by said electrical signal to be rotated.

9. A gear train comprising: a source of rotational motion; a plurality of clutches having driving members and driven members; means coupling said driving members of said clutches to said source; a like plurality of differentials having first input shafts, second input shafts, and output shafts; means cascading said differentials so that each said second input shaft, except that of the first differential, is coupled to the output shaft of a preceding differenial; means locking the second input of the first differential; means coupling said driven members of said clutches through Geneva gears to respective said first input shafts; a like plurality of braking arrangements attached to respective said first input shafts and means for selectively operating individual ones of said clutches and the corresponding braking arrangement on a mutually exclusive basis so that when the braking arrangement is de-energized, the associated clutch is engaged.

10. A gear train comprising: a source of rotational motion; a plurality of clutches having driving members and driven members; means coupling said driving members of said clutches to said source; a like plurality of Geneva gears having driving elements and driven elements; means coupling said driven members of said clutches to respective said driving elements of said Geneva gears; a like plurality of differentials having first input shafts, second input shafts, and output shafts; means cascading said differentials so that each said second input shaft, except that of the first differential, is coupled to the output shaft of a preceding differential; means locking the second input of the first differential; means coupling said driven members of said clutches through Geneva gears to respective said input shafts; a like plurality of braking arrangements attached to respective said input shafts—whereby a "set" comprising a clutch and a braking arrangement is associated with each said differential, said set operating so that when the braking arrangement is de-energized, the associated clutch is engaged; and a holding circuit for each said set, whereby the holding circuit in one of its states engages its associated clutch and releases its associated brake, and when the holding circuit is in its other state it disengages said clutch and applies said brake.

11. The combination of claim 10 wherein said braking arrangements and said clutches are electrically actuated.

12. A gear train comprising: a speed control arrangement comprising a plurality of differentials each having a first input shaft, a second input shaft, and an output shaft; means coupling said second input shafts of each differential, except the first, to the output shaft of its preceding differential to be energized thereby; means for locking the second input shaft of said first differential; means rotating selected said first input shafts—whereby the output of the gear train appears at the output shaft of the last differenial in the form of a shaft rotation that is dependent upon which shafts are selected to be rotated; an angular positioning arrangement comprising a second plurality of differentials each having a first input shaft, a second input shaft, and an output shaft; means coupling said second input shafts of each differential of said second plurality to the output shaft of its preceding differential to be energized thereby; and means rotating selected said first input shafts of said second plurality, said means comprising a coupling to the output shaft of the last differential of said first plurality, said means comprising Geneva gears—whereby the output shaft of said second plurality of differentials rotates only through an angle determined by which shafts of said second plurality are selected to be rotated, the speed of rotation of the output shaft of said second plurality of differentials depending upon the shafts of the first plurality of differentials selected to be rotated.

References Cited in the file of this patent
UNITED STATES PATENTS

| | | |
|---|---|---|
| 2,523,503 | Fairbanks | Sept. 26, 1950 |
| 2,861,475 | Bolie | Nov. 25, 1958 |

FOREIGN PATENTS

| | | |
|---|---|---|
| 534,266 | Canada | Dec. 11, 1956 |